United States Patent
Adogla (10) Patent No.: US 9,448,819 B1
(45) Date of Patent: Sep. 20, 2016

(54) USER-INFLUENCED PLACEMENT OF VIRTUAL MACHINES

(71) Applicant: Amazon Technologies, Inc., Reno, NV (US)

(72) Inventor: Eden Grail Adogla, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 632 days.

(21) Appl. No.: 13/679,451

(22) Filed: Nov. 16, 2012

(51) Int. Cl.
*G06F 9/455* (2006.01)

(52) U.S. Cl.
CPC .................................. *G06F 9/455* (2013.01)

(58) Field of Classification Search
None
See application file for complete search history.

(56) References Cited

U.S. PATENT DOCUMENTS

| | | | |
|---|---|---|---|
| 8,347,288 B1* | 1/2013 | Brandwine | G06F 11/3692 718/1 |
| 2006/0149652 A1* | 7/2006 | Fellenstein | G06Q 30/08 705/35 |
| 2009/0282404 A1* | 11/2009 | Khandekar et al. | 718/1 |

* cited by examiner

*Primary Examiner* — Eric C Wai
(74) *Attorney, Agent, or Firm* — Klarquist Sparkman, LLP (57) ABSTRACT

When launching a virtual machine on a network of server computers, a user has little ability to influence which server computer is used. The embodiments described herein allow a user to specify a parameter that can influence placement on a particular server meeting user-specified criteria. For example, the user can influence placement based on price, a manufacturer, a year that the infrastructure platform was manufactured, a chipset, a hardware card, a processor type, etc. An example API call can allow users to provide guidance on placement preference policy for selecting different generations and/or editions.

19 Claims, 6 Drawing Sheets

USER-INFLUENCED PLACEMENT OF VIRTUAL MACHINES

BACKGROUND

Cloud computing is the use of computing resources including hardware and software as a service over a network. The cloud infrastructure provides computing resources and the ability to provision those resources. Example resources include CPU, memory and local storage. Typically, when launching a virtual machine, a user selects an instance type that generically requests resources, such as an amount of memory, a level of computing power, an amount of storage, etc. The cloud computing service then finds an available server computer and launches the virtual machine conforming to the desired instance type.

DETAILED DESCRIPTION

When launching a virtual machine on a network of server computers, a user has little ability to influence which server computer is used. The embodiments described herein allow a user to specify an additional parameter that can influence placement on a particular server meeting user-specified criteria. For example, the user can influence placement based on price, a manufacturer, a year that the hardware platform was manufactured, a chipset, a hardware card, a processor type, etc. An example API call can allow users to provide guidance on placement preference policy for selecting different generations and/or editions. For example, if m1.small is an API call that designates a virtual machine having a certain amount of memory, then an additional parameter can include a year or manufacturer (e.g. m1.small.2012; m1.small.2013; m1.small.2012.AMD). Users can register default placement policy constructs (such as an ordered list of placement priority) or specify a placement policy at launch time. A deployment component can attempt to honor the user constraints or can fail the launch if the constraints cannot be met. Using such a system, a cloud service provider can set higher prices if users specify the newest hardware platforms. Alternatively, users can save money by selecting more out-of-date or less desirable hardware platforms. The request can be combined with autoscaling functionality. For example, a request can specify to launch on 2011 hardware, and if that is not available then launch on 2010 hardware and increase production capacity by 10% to compensate for known issues with 2010 hardware. This functionality can also be combined with predefined benchmarking to perform fractional vertical scaling of workloads to match generational instance-sizes. For example, a user request can specify to launch on 2010 hardware, but if not possible, use 2011 hardware, but increase workload sent to each 2011 server by 10% to offset the cost of using 2011 hardware.

Figure 1:
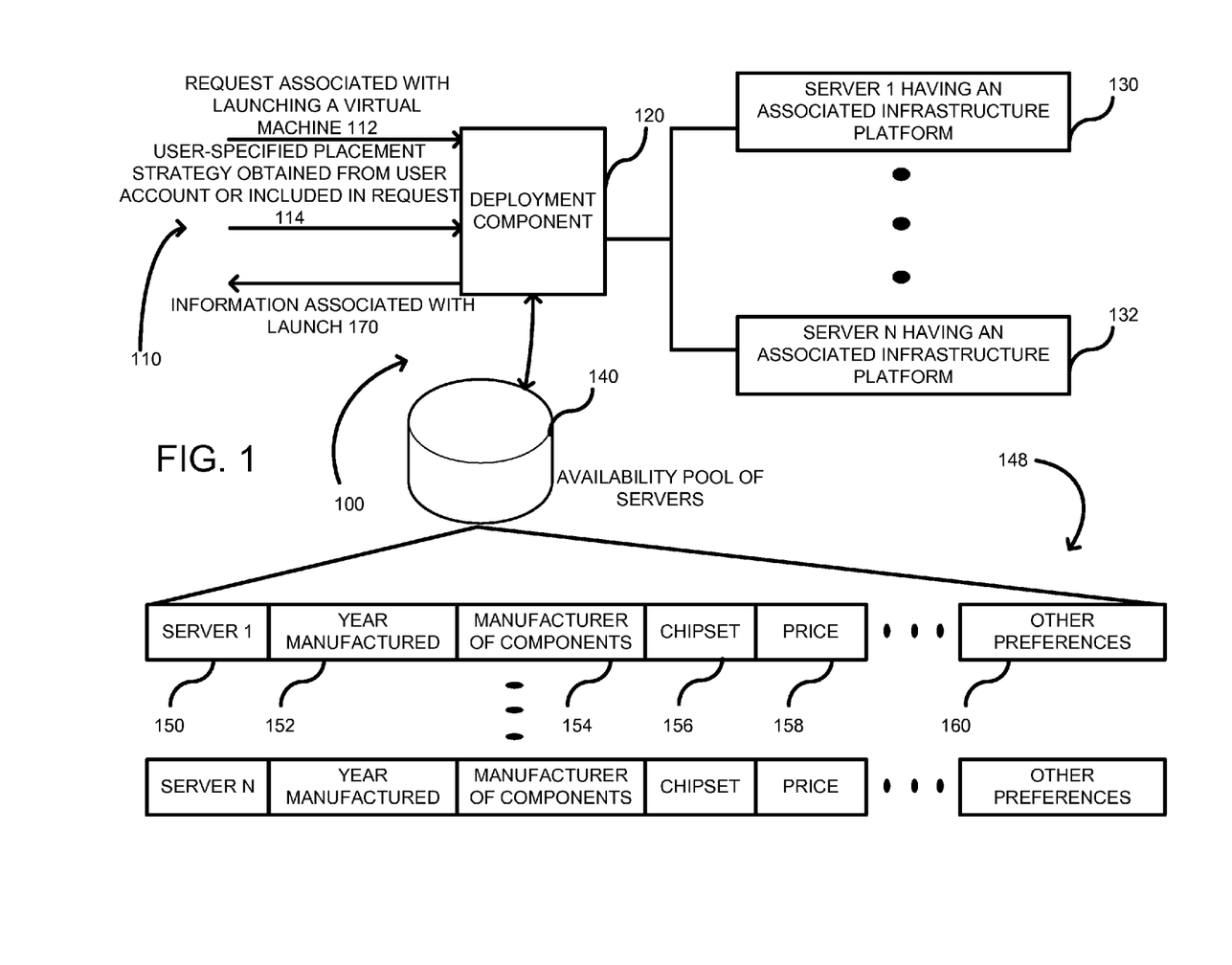
FIG. 1 is an example environment wherein a user can influence placement of a virtual machine or can request information associated with the placement.

FIG. 1 shows an example system 100 that allows user-influenced placement of virtual machines. Although the description discusses virtual machines, it can be extended to application instances running on the virtual machines. A user request is shown at 110 and includes two parts. A first part 112 includes the basic request for launching a virtual machine. An instance type can be included in the request. The instance type is a specification of a virtual machine that generically identifies an amount of memory, CPU capacity, etc., which is well-understood in the art. A second part 114 includes a user-specified placement strategy. The placement strategy can be combined with the first part 112 to make it a single request, or it can be provided separately. For example, the user can have a preference placement list associated with their account that can be accessed when predetermined API calls are made. The request 112, 114 can be received by a deployment component 120 that decides which of a plurality of server computers 130, 132, the instance can or will be launched upon. The server computers 130, 132 represent 1-N server computers that can have any variety of different infrastructure platforms, which can include hardware platforms, software platforms and/or their respective configurations. One example of having different hardware platforms is that one hardware platform can have one or more different chips (e.g., different year, different manufacturer, etc.) than another platform. An example of having different software platforms can be having different operating systems, network topologies, etc. Any number of different platforms can be provided. When the deployment component 120 receives the request 112, 114, it can check a database 140 that includes a list 148 of server computers available in the server pool together with a plurality of parameters associated with the server infrastructure platform that are selectable by the user. For example, the list 148 shows server 1 (identified in the list at 150) as including a year manufactured field 152 (e.g., 2012), a manufacturer of components field 154 (e.g., AMD®, Intel®), a chipset field 156 (e.g., Pentium®), a price field 158, and another other desired preferences, shown generically at 160. The list 148 is only exemplary and not all of the parameters need be used or, alternatively, additional parameters can be added. The portion 114 of the user request includes one or more of the parameters in the list 148. The deployment component can then use the parameters received in the request to filter the list and find one or more matching server computers. The deployment component 120 can then either launch the virtual machine on the matching server computer or it can respond 170 to the user with information associated with the launch. For example, if server 1 is found to be a match, then the price field 158 can be sent back to the user to show a price associated with the launch.

Figure 2:
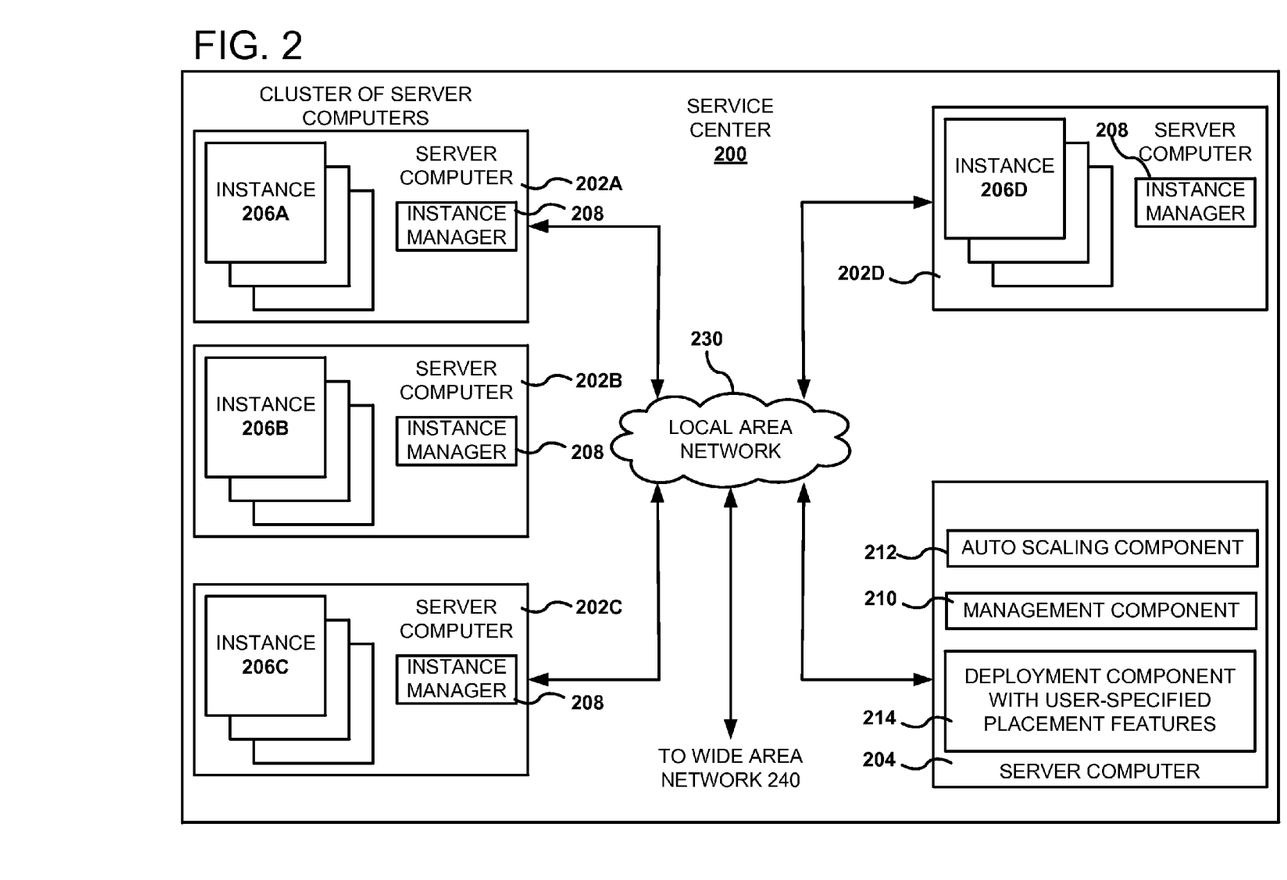
FIG. 2 is an example system diagram for allowing a user to influence placement or to acquire information associated with placement of a virtual machine.

FIG. 2 is a computing system diagram of a network-based service center 200 that illustrates one environment in which user-defined placement can be used. By way of background, the service center 200 is capable of delivery of computing and storage capacity as a service to a community of end recipients. Generally speaking, the service center 200 can provide the following models: Infrastructure as a Service, Platform as a Service, and/or Software as a Service (SaaS). Other models can be provided. For the IaaS model, the service center 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service center platform without the cost of buying and managing the underlying hardware and software. The SaaS model allows installation and operation of application software in the service center. In some embodiments, end users access the service center 200 using networked client devices, such as desktop computers, laptops, tablets, smartphones, etc. running web browsers or other lightweight client applications. Those skilled in the art will recognize that the service center 200 can be described as a "cloud" environment.

The particular illustrated service center 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machine instances. As known in the art, a virtual machine instance is an instance of a software implementation of a machine (i.e. a computer) that executes applications like a physical machine. In the example of virtual machine instances, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications.

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. A server computer 204 can be reserved for executing software components for managing the operation of the server computers 202 and the instances 206. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component can have access to account information associated with the instances, such as who is the owner of the account, credit card information, country of the owner, etc. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214. In this embodiment, the deployment component 214 can act as the deployment component 120 of FIG. 1, and can have access to a list similar to list 148 in FIG. 1 in order to choose upon which server computer to launch the instances 206. The deployment component 214 can receive user-placement preferences and select a corresponding server associated with those preferences, as described herein.

A network 230 can be utilized to interconnect the server computers 202A-202D and the server computer 204, 252. The network 230 can be a local area network (LAN) and can be connected to a Wide Area Network (WAN) 240 so that end users can access the service center 200. It should be appreciated that the network topology illustrated in FIG. 2 has been simplified and that many more networks and networking devices can be utilized to interconnect the various computing systems disclosed herein.

Figure 3:
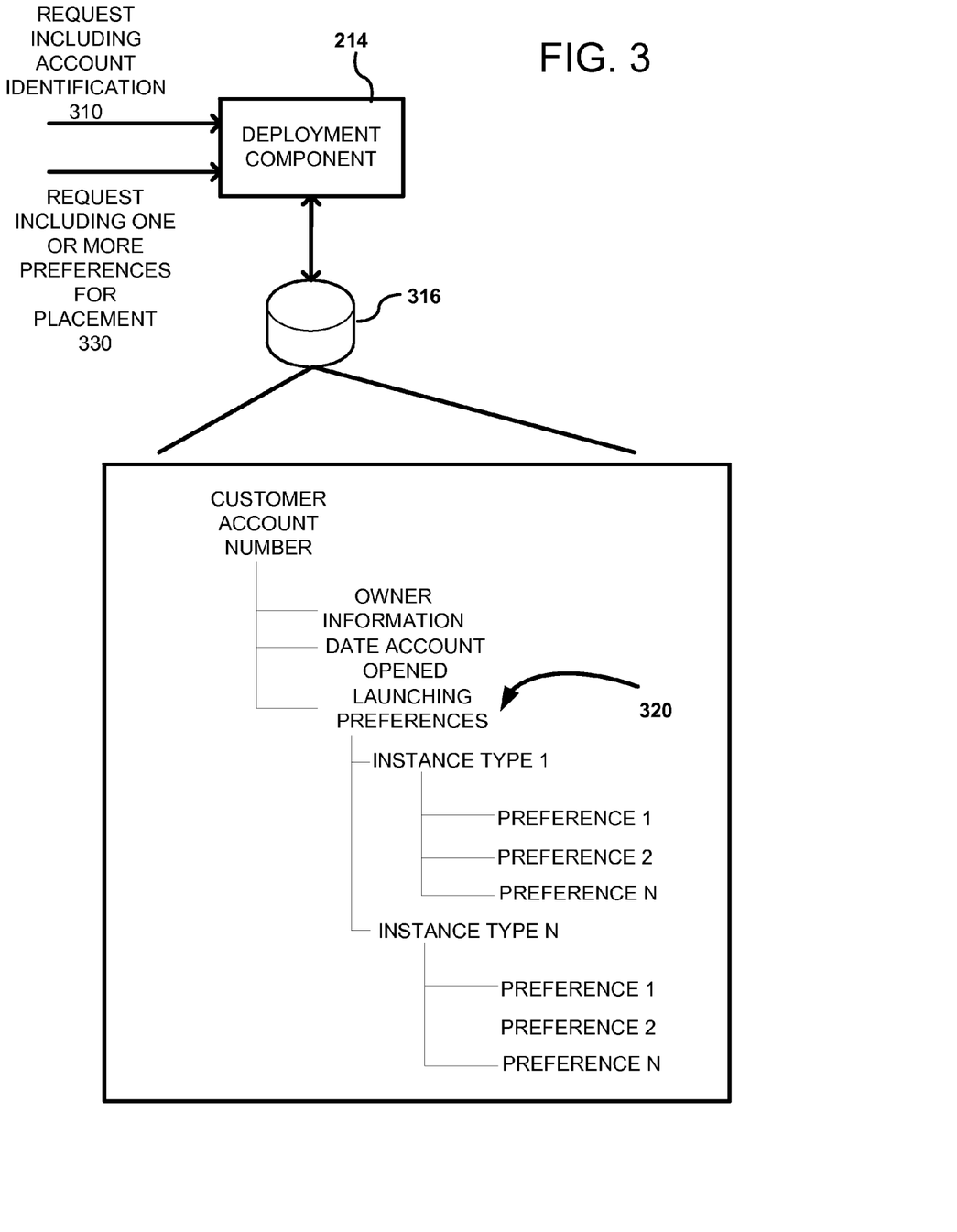
FIG. 3 is an example of a deployment component that can receive requests including placement requests or requests that identify a customer account including stored placement preferences.

FIG. 3 shows further details of how the deployment component 214 operates to provide user-influenced placement. The deployment component 120 (FIG. 1) can operate similarly. The deployment component 214 can receive different types of requests for launching a virtual machine. A first request type 310 can include user account information (e.g., customer account number) plus an instance type. The instance type generally designates a predetermined amount of memory (e.g., 1.7 GB), an amount of computing power, general I/O performance, etc. However, specifics of a manufacturer, year, or chipset, are not included in the instance type. When the request is received, the deployment component 214 can use database 316 to access the customer account using the user account number. The user's account can include information, such as who is the owner, when the account opened, etc. Launching preferences, shown at 320, can also be stored within the user's account. The launching preferences can be previously set up by the user during a configuration phase. Additionally, as shown, the launching preferences can be based on the instance type. For example, one instance type (shown as instance type 1) can be associated with a priority list of infrastructure platform preferences. Other instance types can have other priority lists that are different than that for instance type 1. In this way, the user can influence an infrastructure platform that is selected by using different API calls or including different parameters in an API call. For example, in an API call, a parameter can be used to select one of a plurality of preference lists. Alternatively, all instant types can have a same preference list. A different type of request, shown at 330, can have the preferences in the request itself. In such a case, the deployment component can use the list of preferences from the request. An example request can include "instance type.preference1.preference2 . . . preferenceN, wherein any number of preferences are included.

Figure 4:
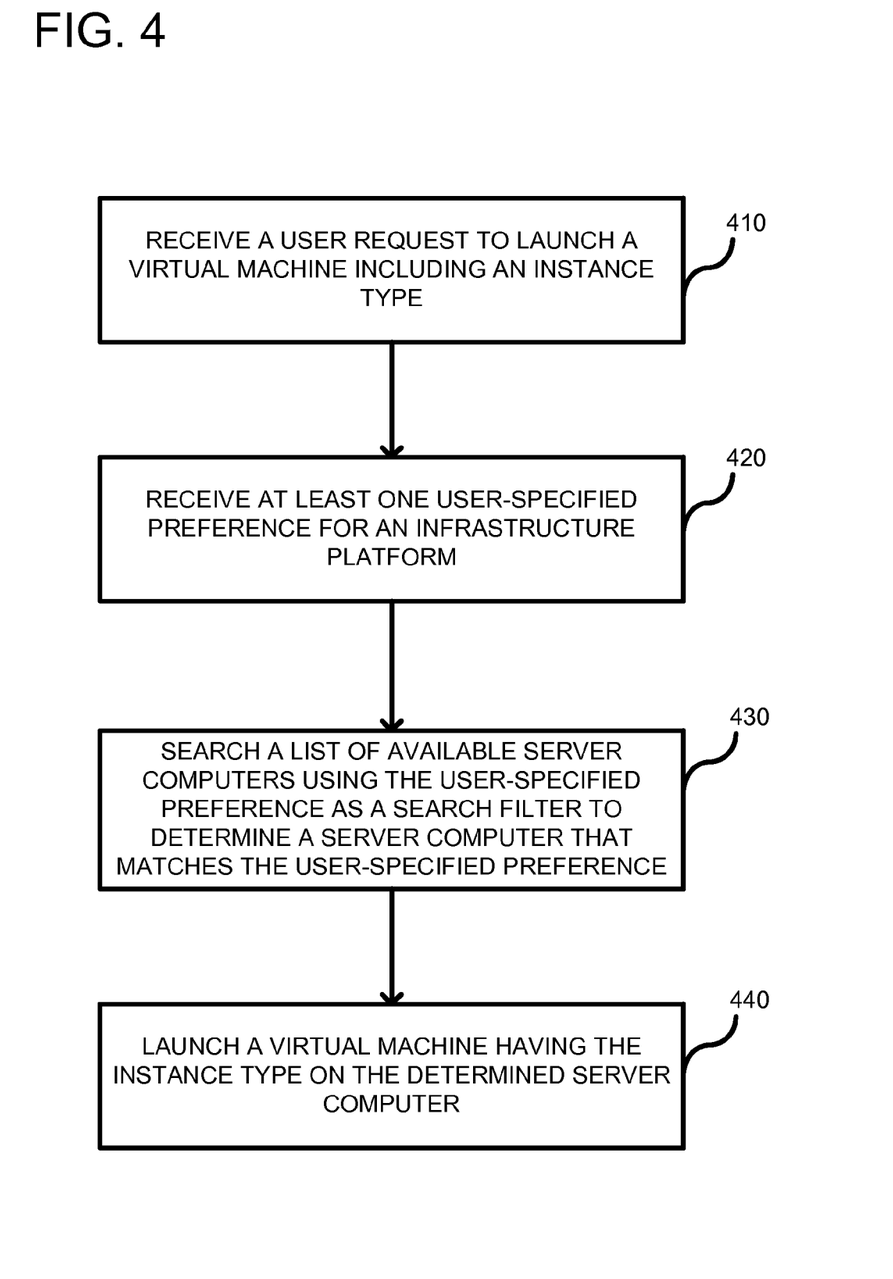
FIG. 4 is a flowchart of a method for launching a virtual machine with user-influenced placement.

FIG. 4 is a flowchart of a method for launching a virtual machine using user-specified preferences. In process block 410, a user request can be received to launch a virtual machine having an instance type. In process block 420, at least one user-specified preference for an infrastructure platform can be received. As previously described, process blocks 410, 420 can be combined into a single request or can be separate. In process block 430, a list of available server computers can be searched using the user-specified preference as a search filter. Using a list, such as list 148 of FIG. 1, the user-specified preference can be compared to the various fields 152, 154, 156, 158, 160, to determine if one of the fields matches the user-specified preference. If a match is found, then the associated server computer can be used to launch the virtual machine (process block 440).

Figure 5:
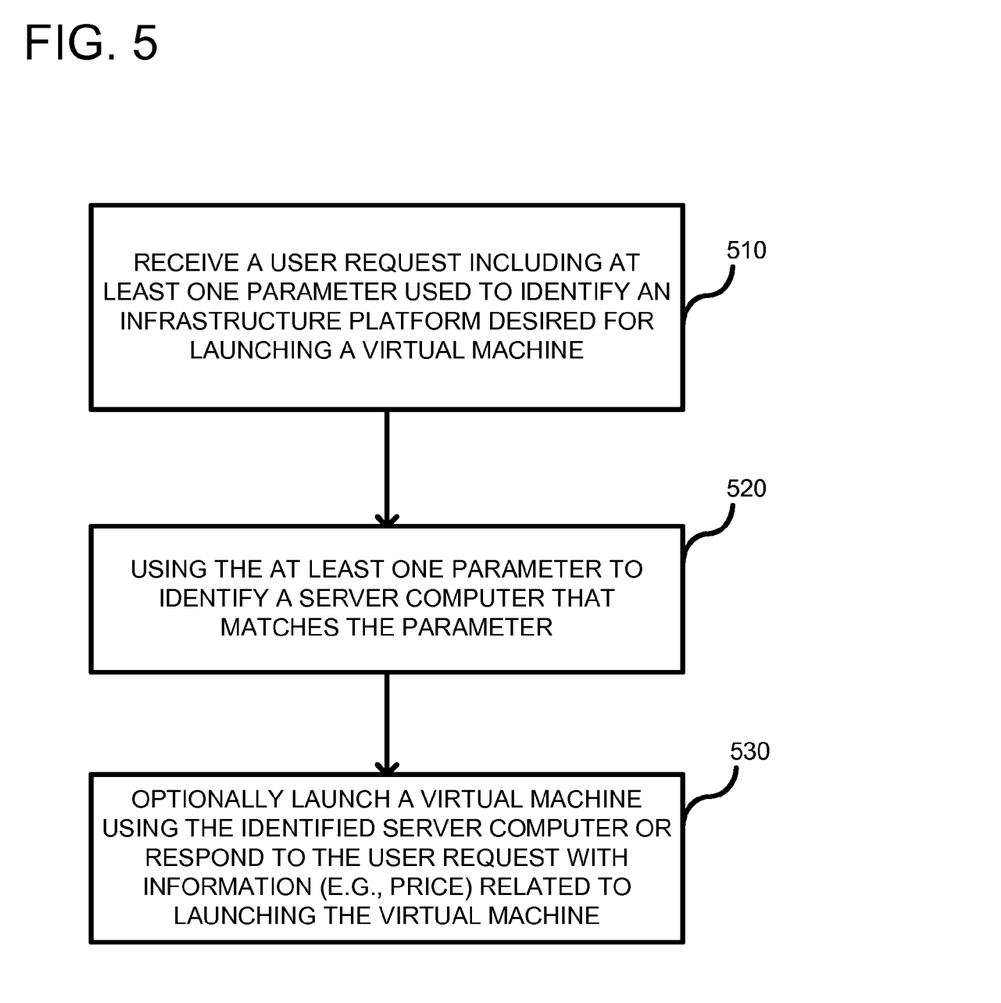
FIG. 5 is a flowchart of a method for taking action in response to a user request including placement information.

FIG. 5 is a flowchart of a method that can be used with the embodiments described herein. In process block 510, a user request can be received including at least one parameter used to identify an infrastructure platform that is desired to launch a virtual machine. The parameter can include a year, a manufacturer, a chipset, or any other infrastructure platform parameter. In process block 520, the parameter can be used to identify a server computer that matches the parameter. One example of using the parameter is by performing a search. In process block 530, the virtual machine can be launched or a response can be sent to the user including information related to launching the virtual machine. For example, a price can be transmitted to the user associated with launching the virtual machine.

Figure 6:
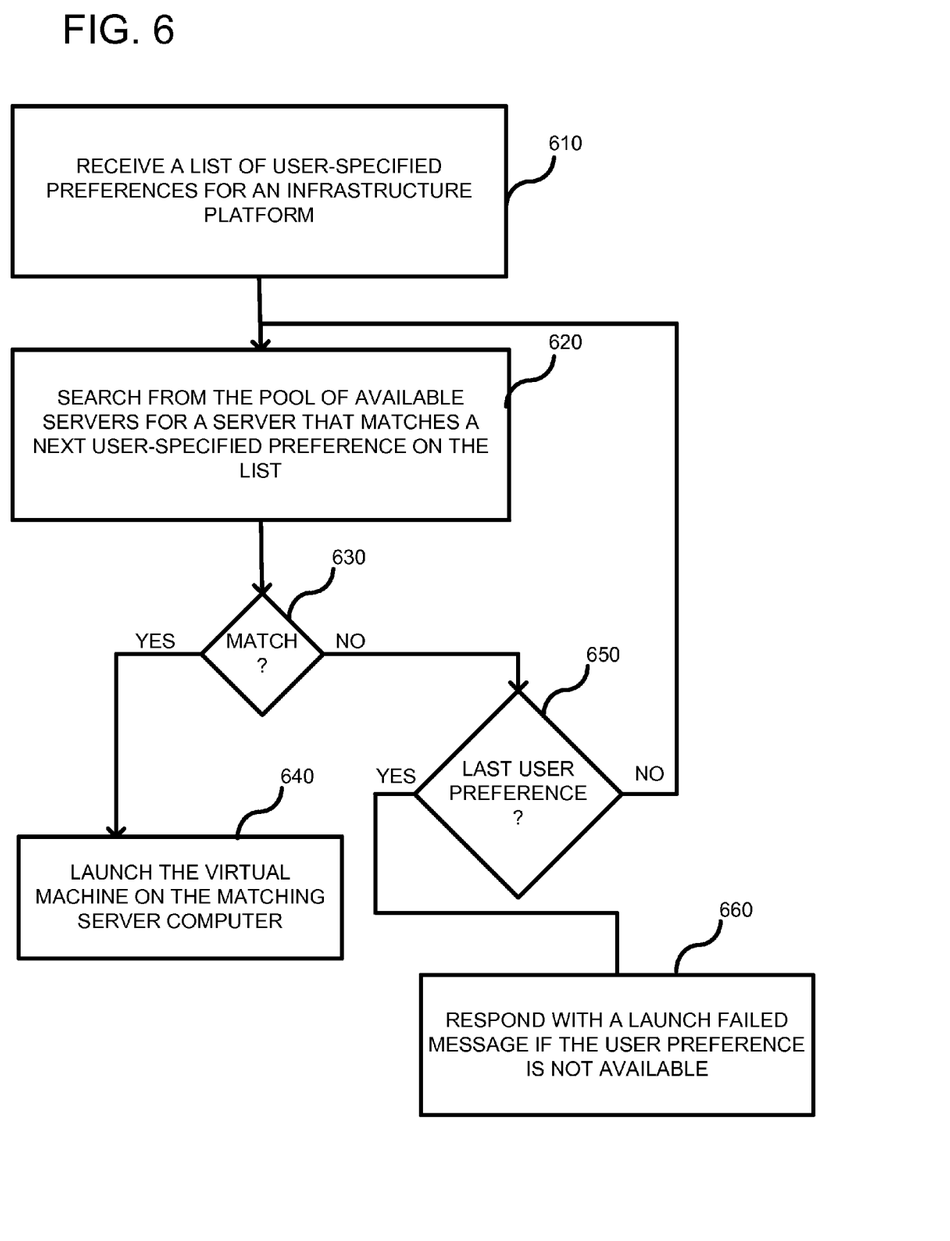
FIG. 6 is a flowchart of a method for implementing a user-defined placement strategy using a list of user-specified placement preferences.

FIG. 6 is a flowchart of a method for launching a virtual machine using a priority list of infrastructure platform preferences. In process block 610, a list of user-specified preferences can be received, wherein the preferences are associated with a desired infrastructure platform. In process block 620, a search can be made from the pool of available server computers for a server that matches a next user-specified preference on the list. Thus, the process starts at the first preference on the list and sequences through the preferences until a match is found. In decision block 630, a check is made to determine if an available infrastructure platform matches the user-specified preference. If a match is found, then in process block 640, the virtual machine is launched on the server computer that was found to be matching. If a match is not found, then in decision block 650, a check is made to determine if this is the last listed user preference. If not, then the process starts over at process block 620 with a next desired user preference from the list. If there are no more user preferences, then at process block 660, a response is sent to the user that the launch failed because none of the user preferences were matched.

A simple example of how the flow of FIG. 6 can be implemented is as follows: a first preference can be for hardware from 2011, but if that is not available, then hardware from 2010, and if that is not available then any server that includes an Intel chipset, and if not available then fail to launch. Thus, a plurality of infrastructure platform candidates can be supplied by the user so as to influence placement of a virtual machine.

More complex examples can also be used, but, generally, the preference list forms a placement strategy for launching a virtual machine. An example of a more complex preference list can be as follows: preference1, preference2, preference3, . . . . The individual preferences can take different formats, such as a set of key-value-pair constraints that must all be satisfied for a server to be considered as being selectable by this preference, a free-form text statement involving Boolean operators, or a specific instance type with predetermined and published properties. Thus, preference1 can be m1.small.2010.Intel, which includes predetermined published properties available for a user to select. Preference2 can be a set of key-value-pair constraints as follows: year: "2010", manufacturer: "Intel", chipset: "Cougar Point"; Preference3 can include Boolean operators as follows: (year==2010 AND (manufacturer !="AMD")) OR (year<=2010 AND vendor==HP). By providing such an overall placement strategy, a user can influence where the virtual machine is launched amongst a plurality of different servers including different hardware and software platforms.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of launching a virtual machine, comprising:
   receiving, at a server computer in a service center, a user request to launch a virtual machine of an instance type;
   receiving at least one user-specified preference for an infrastructure platform to host the virtual machine, the at least one user-specified preference including a year that the infrastructure platform was manufactured or a manufacturer of the infrastructure platform, wherein the at least one user-specified preference includes a priority ordered list of two or more infrastructure platform candidates;
   searching a list of available server computers using the user-specified preference as a search filter to determine a server computer that matches the at least one user-specified preference for the infrastructure platform; and
   launching the virtual machine having the instance type on the determined server computer so that placement of the virtual machine is based at least in part on the at least one user-specified preference.

2. The method of claim 1, wherein receiving the user request to launch the virtual machine and receiving the at least one user-specified preference for the infrastructure platform are in a same request.

3. The method of claim 1, wherein receiving the at least one user-specified preference includes receiving an account number associated with the user request and using the account number to obtain the at least one user-specified preference for the infrastructure platform.

4. The method of claim 1, wherein the infrastructure platform includes a hardware platform and wherein the year is the year that the hardware platform was manufactured.

5. The method of claim 1, wherein searching the list of available server computers further includes identifying the user-specified preference as a first user-specified preference on the priority ordered list and if a server computer does not match the first user-specified preference, then identifying a second user-specified preference on the priority ordered list, and searching for a server computer that matches the second user-specified preference, and if a server computer does not match the second user-specified preference then continuing through the priority ordered list until a match is found or otherwise reject the request.

6. A method associated with the launching a virtual machine, comprising:
   receiving a user request, at a first server computer, including at least one parameter used to identify an infrastructure platform desired for launching of a virtual machine, the at least one parameter including a manufacturer associated with the infrastructure platform, or a year associated with the infrastructure platform, wherein the user request includes a priority ordered list of two or more infrastructure platform candidates that are used to identify the infrastructure platform desired for the launching of the virtual machine;
   using the at least one parameter, to identify a second server computer that matches the infrastructure platform and which is usable to launch the virtual machine; and
   launching the virtual machine on the second server computer, wherein placement of where the virtual machine is launched is controlled, at least in part, by the user request.

7. The method of claim 6, further including transmitting pricing information to the user in response to the request, the pricing information indicating the price associated with launching the virtual machine using the infrastructure platform.

8. The method of claim 6, further including receiving an indication of an instance type from the user in addition to the infrastructure platform.

9. The method of claim 8, wherein the instance type identifies at least an amount of memory available to the instance.

10. The method of claim 6, wherein identifying includes identifying the infrastructure platform by using a year parameter and the year associated with the infrastructure platform is the year that the infrastructure platform was manufactured.

11. A computer-readable storage media including instructions thereon for executing a method associated with launching a virtual machine, the method comprising:
   receiving a user request associated with launching a virtual machine including a first parameter identifying an instance type;
   receiving a second parameter associated with the user request wherein the second parameter specifies a priority ordered list of two or more infrastructure platform candidates used for selection of an infrastructure platform on which the instance type can be launched, the second parameter identifying a chipset associated with launching;
   identifying a server computer that matches the second parameter; and
   launching the virtual machine using the identified server computer or responding to the user request with information related to launching of the virtual machine on the identified server computer.

12. The computer-readable storage media of claim 11, wherein the second parameter includes at least one of the following: a manufacturer, a year that the infrastructure platform was manufactured, a hardware card, or a processor type.

13. The computer-readable storage media of claim 11, further including searching for available server computers that match one of the infrastructure platform candidates in the priority ordered list.

14. The computer-readable storage media of claim 11, wherein the first parameter and second parameter are in a same request.

15. The computer-readable storage media of claim 11, further including receiving an account number and using the account number to obtain the second parameter.

16. A system for launching an virtual machine, comprising:
   a database including a list of available server computers and associated infrastructure platforms;

a plurality of server computers upon which the virtual machine can be launched; and a deployment component coupled to the database that can receive a user request to launch the virtual machine together with at least one user-specified preference for an infrastructure platform including a year associated with the infrastructure platform or a chipset associated with the infrastructure platform and that can use the database to find a server computer amongst the plurality of server computers that satisfies the user-specified preference, wherein the at least one user-specified preference includes a priority ordered list of two or more infrastructure platform candidates.

17. The system of claim 16, wherein the deployment component includes account information associated with the user and wherein the user-specified preference is associated with the account information.

18. The system of claim 16, wherein the at least one user-specified preference includes one or more of the following: a price; a manufacturer; a hardware card; or a processor type.

19. The system of claim 16, wherein the user request further includes an instance type from a plurality of instance types that have predetermined hardware configuration including an amount of memory.

* * * * *